Sept. 13, 1932. J. E. WALBORN 1,877,094
WROUGHT METAL REPAIR DEVICE FOR PIPE LINES
Filed Jan. 26, 1929    2 Sheets-Sheet 1
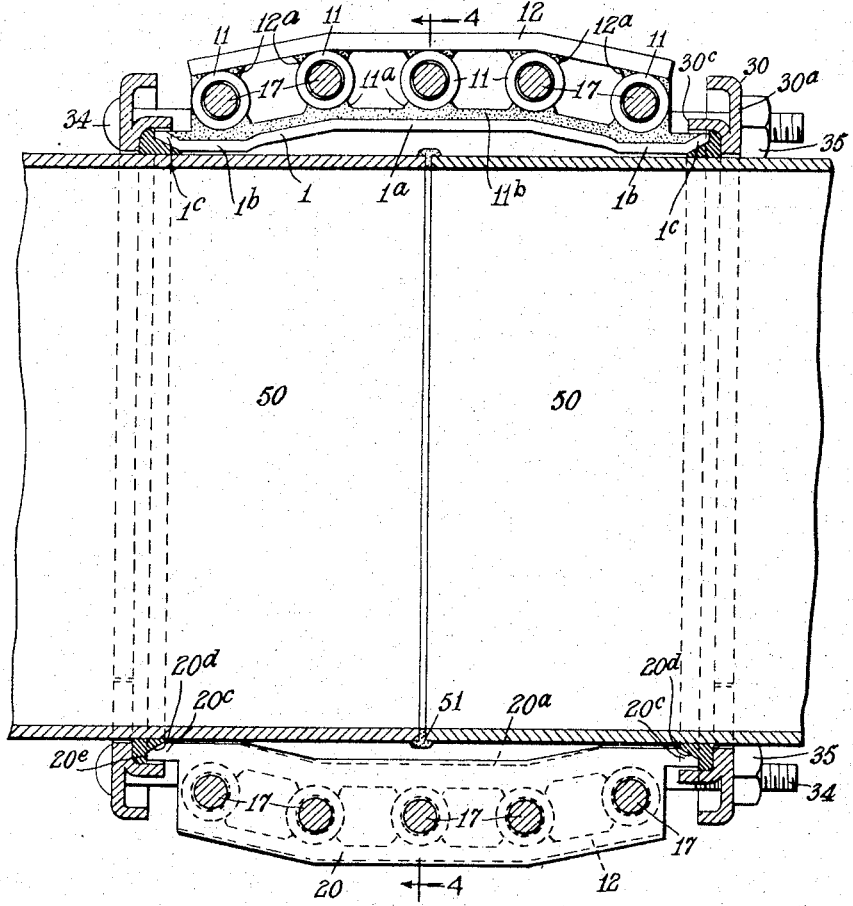
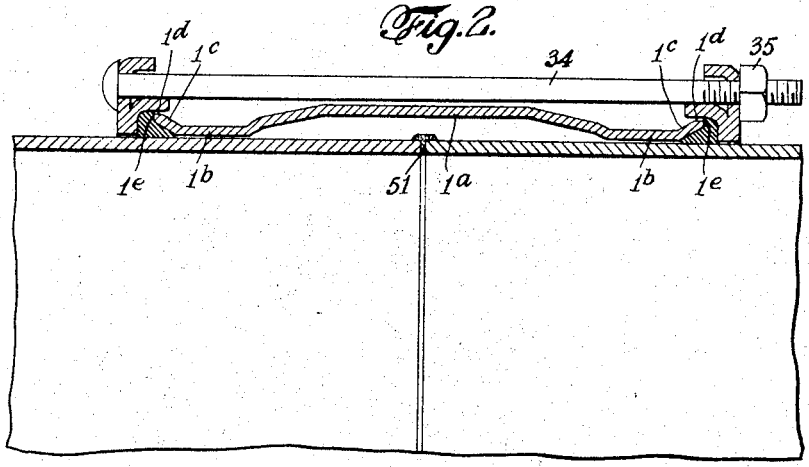

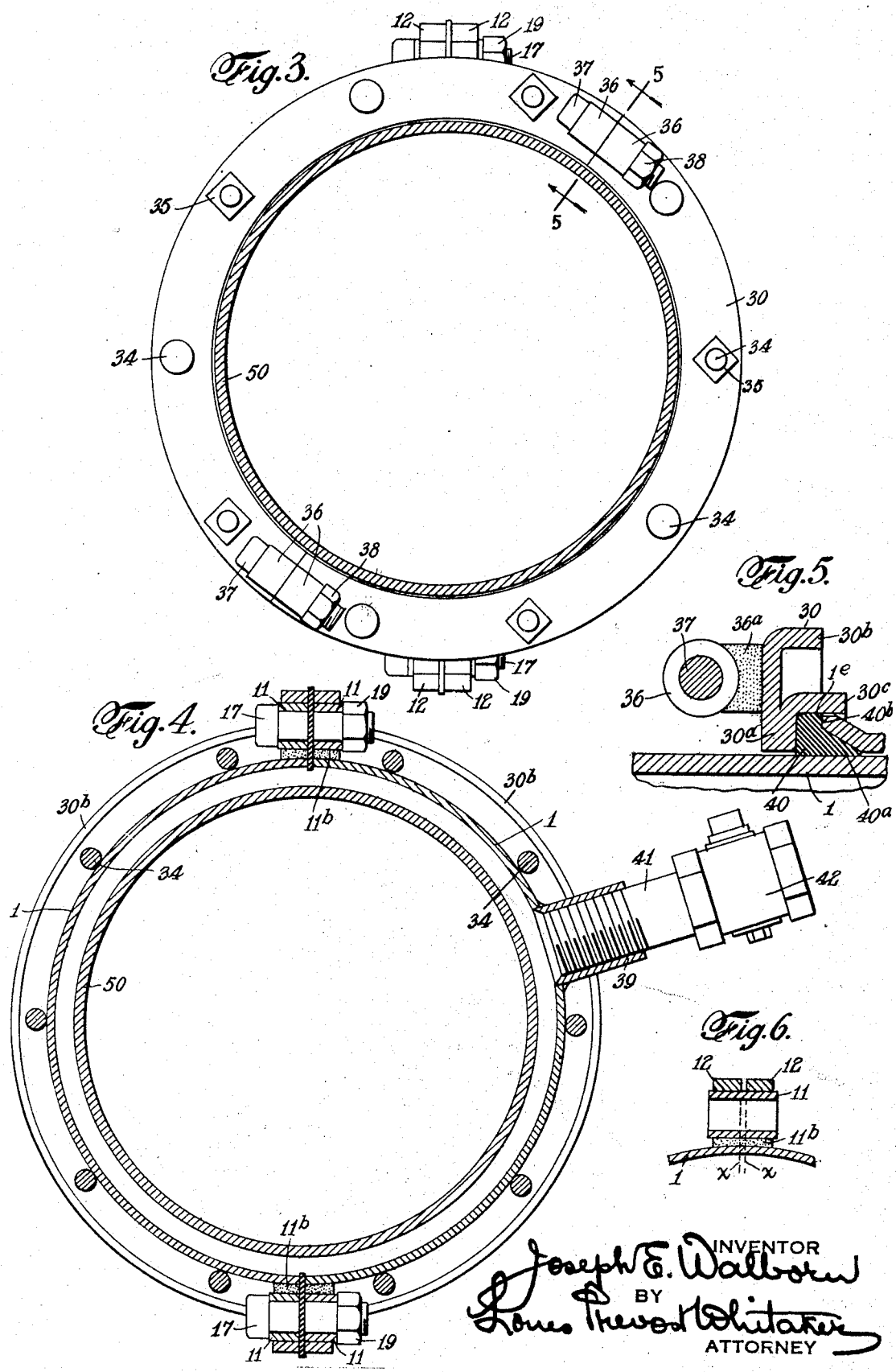

Patented Sept. 13, 1932

1,877,094

UNITED STATES PATENT OFFICE

JOSEPH E. WALBORN, OF BRADFORD, PENNSYLVANIA, ASSIGNOR TO S. R. DRESSER MANUFACTURING COMPANY, OF BRADFORD, PENNSYLVANIA, A CORPORATION OF PENNSYLVANIA

WROUGHT METAL REPAIR DEVICE FOR PIPE LINES

Application filed January 26, 1929. Serial No. 335,339.

My invention consists in the novel features hereinafter described, reference being had to the accompanying drawings which show one embodiment of the same selected by me for purposes of illustration, and the said invention is fully disclosed in the following description and claims.

My invention is a repair device or split sleeve formed entirely of wrought metal and intended principally for use in stopping leaks in pipe lines without necessitating the cutting off of the flow of gas or other material through the line, or disturbing the pipe sections adjacent to the leak, and is an improvement on the split sleeve of the type shown for example in the application of James Clark and myself, filed April 24, 1928 and given Serial No. 272,547. These split sleeves comprise a sleeve member which must be divided longitudinally into two (or more) segmental portions in order to enable them to be placed around connected pipe members in a pipe line, over the leak, without disturbing the line, these segmental portions being bolted together upon side packings and being provided at each end with a packing recess to receive annular end packings which are compressed in said recesses against the exterior of the adjacent pipe sections by means of followers, also made in segmental portions for the same reason above mentioned and provided with bolt holes for clamping bolts which effect the compression of the end packings.

In the development of this art it has been found extremely desirable to make these repair devices of wrought metal in order to avoid the imperfections so frequently found in cast metal, and also to obtain the requisite strength to withstand great internal pressure while making the sleeves sufficiently light to enable them to be readily transported and to be placed in position around the pipe line. As these sleeves are generally used in connection with natural gas lines and other pipe lines extending across the country to great distances, it is frequently necessary to transport them to remote places and to install them entirely by hand labor, as the use of hoisting machinery is in many cases impracticable.

It has, therefore, required much inventive thought to construct such repair sleeves commercially of wrought metal so that when assembled and tightened, perfectly tight joints will be secured along the sides and at each end of the repair sleeves, so as to stop the leak in the pipe which may be conveying gaseous fluid for example under several hundred pounds pressure.

One of the objects of my invention is to form the sleeve segments with integral portions at each end, constructed to provide the necessary end packing recesses and having their outer portions exposed, and to provide the followers with annular retaining walls, forming a packing engaging recess and adapted to extend over the end portions of the sleeve when the end packings are compressed, so that these annular walls of the followers will serve to reinforce the end portions of the sleeve segments containing the packing recesses, and will prevent the possibility of spreading these end portions of the sleeve segments apart or away from the pipe as the end packings are compressed, no matter how much pressure is applied to the follower bolts. My invention also comprehends other features and combinations of parts hereinafter described and fully set forth in the following description and claims.

In the accompanying drawings,

Fig. 1 is a vertical sectional view showing one of my repair devices applied to a pipe line, the sections of which are shown as connected by a welded joint, the side rubber or packing at the upper portion of the figure being removed.

Fig. 2 is a partial sectional view of the same taken on a plane perpendicular to the plane of section of Fig. 1.

Fig. 3 is an end view of the repair device, the adjacent pipe section being shown in section.

Fig. 4 is a transverse section on line 4—4 of Fig. 1.

Fig. 5 is a sectional view on line 5—5 of Fig. 3.

Fig. 6 is a detail sectional view illustrating the manner of constructing the sleeve.

Referring to the drawings, 1, 1, represent the segments of the sleeve which are made of wrought metal, preferably steel or wrought iron, in the form illustrated in the drawings. The sleeve may comprise two or more segments, but it is convenient to form it in two segments as shown, and it will be so described. I also prefer to form the sleeve integrally and saw it into the desired number of segments, although this is not essential. I preferably form the integral sleeve having a central portion indicated at 1ª, enlarged in diameter so as to afford ample clearance for the means normally connecting the adjacent pipe sections, indicated at 50, 50, of the pipe line with which the repair device is to be used. In the present drawings the pipe sections are shown as having their ends welded together, as indicated at 51, and the interior diameter of the enlarged portions, 1ª, of the sleeve, 1, will therefore be made to give ample clearance around the fillet or projecting portions of the weld. It will be understood that in making my improved repair sleeve for application over or around other forms of connections between the pipe sections, to repair leaks therein, such as screw collars or other forms of coupling, the internal diameter of the portions, 1ª, of the sleeve will be made sufficient to accommodate the type of connection around which the repair sleeve is to be used. Adjacent to each end of the sleeve it is provided with cylindrical portions, indicated at 1ᵇ, which I term the pipe engaging portions, the internal diameter of which is made as near to the external diameter of the pipe sections with which the sleeve is to be used as possible and allow for surface variations in the pipe. At the outer end of each of these pipe engaging portions, 1ᵇ, the sleeve is flared outwardly as shown at 1ᶜ, so as to form a packing recess within the same, and the outermost edges of the portions, 1ᶜ, are preferably ground off or otherwise brought into substantially true cylindrical form as indicated at 1ᵈ, although this is not absolutely necessary. The extreme ends of the sleeve, indicated at 1ᵉ, are preferably substantially perpendicular to the axis of the sleeve, as shown. The sleeve, 1, having been formed as previously described, it is severed into the desired number of segments and each segment is provided adjacent to each of its longitudinal edges with bolt engaging means for clamping the segments together upon a side packing. In order to insure the exact registration of the bolt engaging means and reduce the cost of manufacture, I prefer to provide the sleeve before it is separated into segments, with a series of tube sections, 11, disposed transversely with respect to the axis of the sleeve, 1, and centrally of the line of separation between the sleeve segments. In this instance there are two series of these tubes, 11, on diametrically opposite sides of the sleeve. These tubes are securely welded to the sleeve throughout their length, preferably by the use of an electric welding machine and a fusible welding rod or material, and in order to increase the width of the surface adjacent to each edge of the sleeve segment which engages the side packing, I preferably form a continuous strip indicated at 11ᵇ, outwardly projecting portions, 11ª, of which are welded to the tube sections, 11. In order to reinforce the tube sections I provide each series thereof with a pair of parallel reinforcing bars, 12, see Figs. 3, 4 and 6, which are spaced a distance apart, as indicated at y in Fig. 6, substantially equal to the width of a saw kerf, each of said bars being welded to all the sleeves, 11, of the series, as indicated at 12ª. After the reinforcing bars, 12, have been welded in place, the entire sleeve is preferably sawed into sections, removing the kerf, the width of which is indicated by dotted lines, x, x, in Fig. 6, which is of a width a little less than the side packings hereinafter described. This method of forming the sleeve sections provides for great accuracy in the fit and insures the registration of the portions of the tube sections through which the side bolts are passed, and provides great strength. It will be understood that the tube sections, 11, can be sawed or cut from stock tube, and the bars, 12, 12, can be likewise sawed or cut from stock of the desired dimensions, and by employing two parallel bars, 12, separated the width of the saw kerf instead of using a single bar, a considerable saving in the labor of sawing is effected. It will be understood, however, that the sleeve segments may be formed separately from each other and the longitudinal edges of said segments may be separately provided with shorter tube sections, 11, reinforced by bars, 12, if this should be found convenient or desirable, although it is believed that economy of manufacture will be secured by making and welding together the parts as previously described and then sawing the sleeve into segments.

In Fig. 1, I have shown, in the lower portion of the figure, one of the side packings indicated as a whole by the numeral 20. This packing is a flat sheet of rubber of a thickness a little greater than the width of the saw kerf above referred to to allow for the compression of the packing. Each side packing is provided with a plurality of apertures adapted to register substantially with the apertures in the tubes, 11, and to fit upon the side bolts, 17, hereinafter referred to. The inner edge of each strip will extend to or inside of the inner edge, 20ª, of the adjacent sleeve sections, while the outer edge, 20ᵇ, will extend to or beyond the outer surfaces of the adjacent reinforcing bars, 12, indicated in dotted lines in the lower portion of Fig. 1. At each end the side packing strips are provided with longitudinally extended portions, 20°, which are provided with the inclined surfaces, 20ᵈ, conforming with the inner surface of the end flange portion, 1ᵉ, of the sleeve section, and a perpendicular end face, 20ᵉ, corresponding with the end face, 1ᵉ, of said end flange portions.

It will be seen that the sleeve segments can be placed around a leaky joint and secured together by bolts, 17, and nuts, 19, upon the end packings, 20, so as to form a rigid enclosing sleeve providing a packing recess at each end, and it will be noted that the spaces between the segments are made gas-tight by the side packings, and that the projecting portions, 20°, thereof conform exactly to the shape of the packing recesses.

In connection with this divided sleeve, I employ two followers also formed of wrought metal, as wrought iron or steel. These followers are indicated as a whole by the numeral, 30, and each comprises an annular plate member, 30ᵃ, which may be and preferably is reinforced at its outer periphery by an annular upturned flange, 30ᵇ, the inner periphery of said plate member fitting very closely the exterior of the adjacent pipe section, and said plate member being provided with an annular flange member, 30°, forming an annular packing engaging recess within the same. The inner diameter of the annular flange member, 30°, is substantially the same as the exterior diameter of the end flanges of the sleeve, and the annular flange, 30°, is of sufficient length in the direction of the axis of the ring or follower so that it can extend well over the adjacent end flange of the sleeve with which the follower is used, as clearly shown in the drawing, so that it is impossible for the sleeve segments to separate after the followers are in place, and it is also impossible for the end flanges, 1ᵉ, of the sleeve to be bent outwardly, as the encircling portions of the follower flanges, 30°, reinforce the end flanges of the sleeve and will prevent any outward movement thereof.

I prefer to form the followers integrally and saw them into two (or more) segments on a diametric line, as indicated for example in Fig. 3, to enable the followers to be placed in position around the pipes without disturbing them, and the segments of each follower are united rigidly in any desired way. In this instance I have shown the meeting ends of the follower segments provided with tube sections, 36, 36, to receive connecting bolts, 37, provided with nuts, 38. These tube sections, 36, can be welded to the opposite ends of each follower segment, preferably by the use of welding material, 36ᵃ, and the electric welding machine after the follower is sawed in two, or the two tube sections may be of twice the length necessary for a single segment and welded at opposite points on the outer face of the plate member, 30ᵃ, of the follower, before it is separated into segments, and the tube sections can then be sawed at the same time that the follower is sawed. The interior diameter of the follower will be made such that after sawing into segments, the segments will very closely embrace the pipe when brought together and united by the bolts, 37, and nuts, 38. It will be obvious that the segments of the follower may be formed separately from the beginning of their manufacture if it should be found desirable to do so.

In connection with the sleeves and followers, I employ at the end of each sleeve an annular packing, preferably of rubber and of the well known Dresser type. These packings are indicated by the numeral 40, and each comprises a conical wedging portion, 40ᵃ, having a cylindrical interior diameter and inclined outer face to fit into the packing recess formed at each end of the sleeve, the main body of the packing ring 40, being adapted to fit into the packing recess in the follower and being provided with a transversely disposed annular face, indicated at 40ᵇ, to fit against the end face, 1ᵉ, of the end flange of the sleeve. The packing rings, 40, are preferably cut diagonally at one point in a well known manner to allow them to be brought around the pipe section, 50, and the inclined ends lapped to form an integral ring, the beveled portion of which is then shoved into the packing recess at the adjacent end of the sleeve. The followers are placed around the pipe sections beyond the packing rings, 40, their segments are rigidly connected together as before described, and the followers are moved up against the packing rings so as to bring their enclosing flanges, 30°, around the ends of the sleeve. The followers are provided with a plurality of registering bolt holes in their plate members, 30ᵃ, and a series of clamping through bolts, 34, are passed through the registering holes of the followers and secured by nuts, 35. When these nuts are turned up the end packing rings, 40, will be compressed in a direction longitudinally to the axis of the pipe sections so as to wedge them firmly between the exterior surface of the pipe, the interior surface of the end flanges of the sleeve, the end faces of said end flanges and the inner faces of the packing recesses of the followers. At the same time the annular flanges, 30°, of the followers will be forced further over the end flanges of the sleeve, so as to cause the said end flanges to contact with the flanges, 30°, at points very close to the plate members, 30ᵃ, of the followers if there is any tendency whatever of the end flanges of the sleeve segments to either separate or bend outwardly, so that the flanges 30°, of the followers tend to reinforce the sleeve ends and insure the tightness of the end packings no matter how severely the through bolts and nuts are tightened instead of tending to distort and separate the end packing recess forming portions of the sleeve, as would be the case with a type of follower in which the packing engaging portion was constructed to enter the end packing recesses of the sleeve. It will be noted that my invention provides a very simple, light and comparatively cheap repair sleeve formed entirely of wrought metal and so constructed that it can be readily placed in position, assembled and tightened up so as to bring it into a gas-tight condition around a leak in a pipe line, in which the followers reinforce the end packing engaging portions of the sleeve and prevent the possibility of distortion thereof or separation of the segmental portions thereof.

In Fig. 4, I have shown one of the segments of the sleeve provided with an interiorly threaded collar, 39, welded into an aperture in the segment to receive a relief pipe, 41, provided with a cut-off valve, 42. This is desirable especially where the repair sleeve is used in repairing a leak in a line carrying fluid, as natural gas for example, under very high pressures. The valve, 42, is left open while the repair sleeve is assembled over the leak and tightened up to make it gas-tight, after which the valve, 42, is closed and no further leakage of the pipe line at that point can occur. If this relief valve is not employed, the pressure in the line, as the packings are tightened up and the repair sleeve approaches a gas-tight condition, may cause the imprisoned gases to accumulate to such high pressure, approximately that within the line, as to blow out the packings before they are secured and finally tightened up, and thus interfere with the application of the repair sleeve. I do not, however, make any claim to this relief valve.

What I claim and desire to secure by Letters Patent is:—

1. As a new article of manufacture, a split sleeve for repairing pipe lines, formed of wrought metal and divided longitudinally into segments, said sleeve being provided at each end with outwardly flared portions forming end packing recesses, and terminating at the outer edges of said recesses, each segment of the sleeve being provided along each longitudinal edge thereof with a longitudinal series of tubes welded thereto with their axes perpendicular with the adjacent edge of the sleeve segment, a separately formed reinforcing bar welded to the outer sides of the tubes of each section, side packings between the meeting edges of said segments, side clamping bolts engaging the tubes of adjacent sections, end packing rings engaging said end packing recess of the sleeve, and projecting beyond the ends of said sleeve, followers provided with annular plate members provided with bolt holes and annular flanges forming packing recesses, said flanges having sufficient internal diameter to fit over and reinforce the split flared end portions of the sleeve, and clamping bolts and nuts for said followers.

2. As a new article of manufacture, a split sleeve for repairing pipe lines, formed of wrought metal, and divided longitudinally into segments, and provided with end packing recesses, side packings, and side clamping bolts, annular packing rings for said end packing recesses, and followers each provided with an annular plate member, provided with bolt holes, and packing engaging portions for engaging the end packing rings, each of said followers comprising separate segments, each provided at each end with a separately formed tube welded thereto with its axis coaxial with the tube on the meeting end of an adjacent segment, connecting bolts extending through the adjacent tubes and provided with nuts for uniting said follower sections, and clamping bolts and nuts for said followers.

3. As a new article of manufacture, a split sleeve for repairing pipe lines formed of wrought metal, and divided longitudinally with segments, and provided with end packing recesses, side packings, and side clamping bolts, annular packing rings for said end packing recesses, having portions projecting outside of said recesses, and followers each having an annular plate member provided with bolt holes, and an annular flange member having its interior diameter sufficiently great to fit over and reinforce the split end packing recess portions of the sleeve, each of said followers being formed in segments and having each end of the plate member portion of each segment provided on the face opposite to the flange portion, with a separately formed tube welded thereto, the tubes at meeting ends of adjacent segments being coaxial, connecting bolts and nuts for connecting the coaxial tubes of said follower segments, and through bolts and nuts connecting said followers.

In testimony whereof I affix my signature.

JOSEPH E. WALBORN.